United States Patent Office 2,858,303
Patented Oct. 28, 1958

2,858,303

AZO PIGMENTS

Ernst Keller, Binningen, Basel Land, and Emil Stocker, Riehen, near Basel, Switzerland, and Fritz Mindermann, Grenzach, Baden, Germany, assignors to J. R. Geigy A.-G., Basel, Switzerland No Drawing. Application February 15, 1957
Serial No. 640,340

Claims priority, application Switzerland March 2, 1956

7 Claims. (Cl. 260—176)

The present invention concerns greenish to reddish yellow pigments of the azo series which are distinguished by their good fastness to light and their ability of practically not migrating in lacquers or thermoplastic synthetic substances. The invention also concerns the production of these new azo pigments, the use thereof for pigmenting natural and synthetic high molecular substances and, finally, as industrial product, the materials fast coloured with the aid of the pigments according to the present invention.

It has been found that azo pigments having very good fastness to light and migration are obtained if compounds of the general Formula I

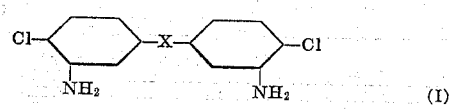

wherein X represents a linear bridging member embracing two carbon atoms in which the carbon atoms are saturated by oxygen, hydroxyl groups and/or hydrogen, are tetrazotised and coupled with such azo components as contain a ketomethylene group which can be coupled and contain no acid water solubilising groups. Thus the linear bridging member X of the tetrazonium component consists of two identical or different members of the series of the carbonyl, hydroxymethylene and methylene groups.

The amino compounds used for the production of the diazo components according to the present invention can be produced by methods known per se from known starting products. Thus, from the already known 4.4'-dichlorobenzil, 4.4'-dichloro-3.3'-dinitrobenzil is obtained by nitration. From this compound 4.4'-dichloro-3.3'-diaminobenzil is obtained under suitable reduction conditions. 4.4'-dichloro-3.3'-diaminobenzoin and -hydrobenzoin can be prepared from this compound or direct from 4.4'-dichloro-3.3'-dinitrobenzil by catalytic hydrogenation. Also mixtures of amino compounds which correspond to the general Formula I can be used, for example technical mixtures of compounds obtained in the various stages of reduction such as occur under certain conditions in the hydrogenation of 4.4'-dichloro-3.3'-dinitrobenzil. The last step of the reaction to form 4.4'-dichloro-3.3'-diaminodibenzyl can be performed advantageously with hydrazine. However, also other methods known per se can be used to produce 4.4'-dichloro-3.3'-diaminobenzil and compounds which are derived therefrom by reduction or hydrogenation of the diketo group.

The simplest way of tetrazotising these diamino compounds is, for example, in mineral acid medium in the cold with sodium nitrite.

As azo components having a ketomethylene group which can be coupled, both those containing the group in open chain as well as those in which it forms a component of a heterocyclic ring can be used according to the present invention. The azo components should not contain any acid water solubilising groups such as the sulphonic acid and the carboxyl group. Examples from the class of acyl acetic acid derivatives containing the ketomethylene group in open chain are acetoacetic acid anilide, acetoacetic acid chloranilides, dichloranilides, toluidides, chlorotoluidides, xylidides, anisidides, phenetidides; acetoacetic acid dimethoxy cyananilide, 2.5-dimethoxy-4-chloranilide; benzoyl acetic acid anilide and di-acetoacetic acid-o-tolidide. Examples of compounds containing the ketomethylene group in a heterocyclic ring are 5-pyrazolone derivatives such as 1-phenyl-3-methyl - 5 - pyrazolone, 1-phenyl-3-carbethoxy-5-pyrazolone, the three 1-(chlorophenyl)-3-methyl-5-pyrazolones, tolylmethyl-5-pyrazolones and also e. g. dihydroxyquinolines.

The diazonium compounds according to the present invention are coupled with the azo components by methods known per se.

If desired, capillary active compounds such as wetting agents, dispersing agents and/or protective substances can be added either during or after the production of the pigments. For example solutions of alkali soaps of higher fatty acids, colophony soaps or also emulsions of fats, paraffins, waxes or fatty oils and also plasticisers such as are used in the lacquer and plastics industry and which can be produced with the aid of soap or other emulsifiers are suitable for this purpose. It is possible to obtain pigments of a softer texture by the addition of such auxiliary agents. If desired, the pigments can also be produced in the presence of other organic or also inorganic substrata. After isolation, the pigments are converted, if necessary with the addition of organic or also inorganic binding and/or diluting agents, into the form desired for use, e. g. in the form of powders, pastes, semi-solid or solid concentrates (masterbatches). The so-called "flushing process" is advantageous for the preparation of pastes in organic agents.

The azo pigments claimed have the general formula:

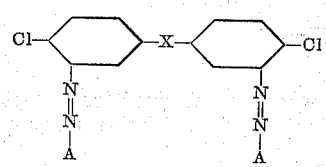

wherein X represents a bridge selected from the group consisting of $$-CH_2-CH_2-,\ -\underset{\underset{OH}{|}}{CH}-\underset{\underset{OH}{|}}{CH}-,\ \text{and}\ -\underset{\underset{O}{\|}}{C}-\underset{\underset{O}{\|}}{C}-$$

A represents a member selected from the group consisting of 1-phenyl-3-methyl-5-pyrazolon-4-yl and α-actoacetic acid phenylamide radicals.

Because of their pure greenish yellow shade, the compounds which contain an acetoactic acid derivative as azo component are particularly valuable. They correspond to the formula:

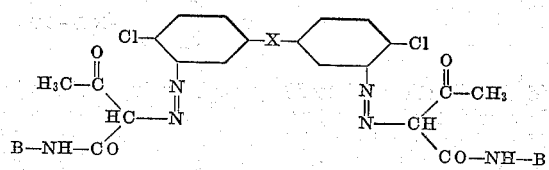

wherein X is a bivalent bridging member as defined above, and B represents a mononuclear carbocyclic aryl radical.

The azo compounds according to the present invention are particularly suitable for pigmenting high molecular natural and synthetic substances such as rubber, paints and lacquers, organic polymerisation, polycondensation and polyaddition products. They are also suitable for the pigmenting of spinning masses for synthetic fibres, in particular for viscose and for pigment printing on textiles.

The greenish to reddish yellow pigmentations and prints obtained are distinguished by their remarkable fastness to light, their transparency and their good fastness to oil and cross lacquering. Some of them are also distinguished by their purity of shade. In thermoplastic synthetic substances, e. g. in polyvinyl chloride, the pigments according to the present invention have no, or only a slight, tendency to migrate. They are excellently fast to heat and cross lacquering in so-called stoving lacquers.

The following examples illustrate the invention without limiting it in any way. Where not otherwise stated, parts are given as parts by weight and the temperatures are in degrees centigrade. The relationship of parts by weight to parts by volume is as that of kilogrammes to litres.

Example 1

15.45 parts of 4.4'-dichloro-3.3'-diaminobenzil are heated for a short time in 75 parts by volume of 10 N-hydrochloric acid, then cooled and 250 parts of ice water are added. The whole is then tetrazotised at 5–10° with 100 parts by volume of 1 N-sodium nitrite solution.

18.4 parts of acetoacetic acid anilide are dissolved in 900 parts of water of 65° and 12 parts by volume of 10 N-hydrochloric acid. 110 parts of crystallised sodium acetate dissolved in 330 parts of water and 1.5 parts of triethanolamine oleate emulsified in 60 parts of water are added. 0.4 part of decolourising carbon is then added to the tetrazo solution which is then poured in one hour through a filter while stirring into the 8–10° cold acetoacetic acid anilide suspension. After stirring for 2 hours at 20°, the product is filtered off, washed and dried at 60°. It corresponds to the formula

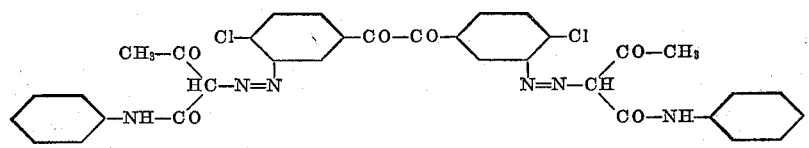

From the pigment so obtained for example, very pure, greenish yellow polyvinyl chloride sheets of high transparency and very good fastness to light can be produced. The sheets are practically fast to migration.

If in this example, 18.4 parts of acetoacetic acid anilide are replaced by 19.7 parts of acetoacetic acid-p-toluidide and 1500 parts of water of 80° are used as well as hydrochloric acid to dissolve, then a more strongly coloured yellow which is somewhat more reddish is obtained. It has similar fastness properties.

The 4.4'-dichloro-3.3'-diaminobenzil used in this example is produced as follows:

279 parts of pulverised 4.4'-dichlorobenzil are slowly added while stirring into 500 parts by volume of fuming nitric acid, the temperature not being allowed to exceed 60°. The whole is then stirred for 6 hours at 63–67°, cooled and the reaction mixture is poured into 2700 parts of ice water. The yellow precipitate is filtered off under suction, washed with ice water and alcohol and dried. Yield: 324 parts, M. P. 195–197° (corr.) content, determined titanometrically: 98.8%.

Elementary analysis:

|  | found | calculated for 4.4'-dichloro-3.3'-dinitrobenzil $C_{14}H_6O_6N_2Cl_2$ |
| --- | --- | --- |
|  | Percent | Percent |
| C | 45.35 | 45.50 |
| H | 1.63 | 1.63 |
| N | 7.49 | 7.59 |
| Cl | 19.25 | 19.25 |

A suspension with a particle size of about 1 to 5μ is produced by grinding 184.5 parts of 4.4'-dichloro-3.3'-dinitrobenzil with 5 parts of a non-ionogenic dispersing agent of the ethylene oxide type and water. This paste is poured into a 95° warm suspension of 250 parts of cast iron filings in 300 parts of water and 10 parts by volume of hydrochloric acid conc. The paste should be in an iron vessel and is stirred for 5½ hours at 95°. The reaction is then made weakly alkaline with sodium carbonate, the reaction mixture is cooled, filtered and the product is washed and dried. By repeated extraction with hot ethyl acetate and evaporation, the diamine is obtained in the form of intensive reddish yellow crystals with melt at 193–195° (corr.). Content, according to nitrite used: 96.4%.

Elementary analysis:

|  | found | calculated for 4.4'-dichloro-3.3'-diaminobenzil $C_{14}H_{10}O_2N_2Cl_2$ |
| --- | --- | --- |
|  | Percent | Percent |
| C | 54.66 | 54.40 |
| H | 3.11 | 3.26 |
| N | 8.95 | 9.06 |
| Cl | 22.50 | 22.95 |

Example 2

A tetrazo solution is prepared according to Example 1. Also 21.8 parts of acetoacetic acid-p-chloranilide are dissolved in 900 parts of water and 360 parts of 2 N-caustic soda lye. At 8 to 10° glacial acetic acid is added dropwise while stirring until the reaction is neutral to litmus paper and then an emulsion of 1.4 parts of triethanolamine oleate in 56 parts of water is added dropwise. The filtered tetrazo solution is then added in one hour while stirring. On completion of the coupling, the mixture is filtered, the product washed and dried at 60°. It corresponds to the formula

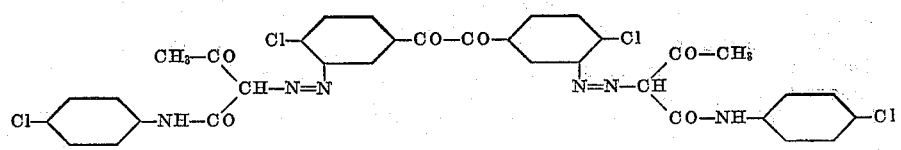

A greenish yellow pigment which has very good fastness to light in polyvinyl chloride is obtained. It has only a very slight tendency to migrate.

Analogous pigments can be produced from acetoacetic acid-o-anisidide, -p-anisidide, -2.5-dimethoxy-4-chloranilide or -m-xylidide. They have greenish to reddish yellow shades and have very good fastness properties in polyvinyl chloride.

Example 3

15.65 parts of 4.4'-dichloro-3.3'-diamino hydrobenzoin in 400 parts of water and 125 parts by volume of 2 N-acid are tetrazotised at 0–3° with 100 parts by volume of 1 N-nitrite solution. In addition, 18.25 parts of acetoacetic acid anilide are dissolved in 1500 parts of water of 65° with the addition of 60 parts by volume of 2 N-hydrochloric acid. After the addition of 160 parts by volume of 2 N-sodium acetate solution and 1.6 parts of triethanolamine oleate emulsified in a little water, the volume is brought up to 2000 parts by volume and the temperature to 8–10° and the clear tetrazo solution is

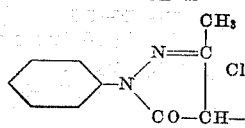

poured in while stirring in one hour. The temperature is then raised to 20°. On completion of the coupling, the whole is heated for another hour at 85–90°, the product is filtered off, washed and dried at 60°. A brilliant, greenish yellow pigment is obtained which has excellent fastness to heat and cross lacquering in stoving lacquers and which has good fastness to light. The pigment corresponds to the formula

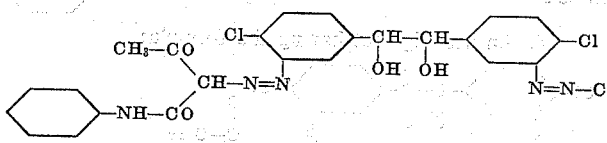

A similarly valuable product is obtained if in this example the acetoacetic acid anilide is replaced by 19.7 parts of acetoacetic acid-p-toluidide.

The 4.4'-dichloro-3.3'-diamino-hydrobenzoin used in this example is produced as follows:

92.3 parts of 4.4'-dichloro-3.3'-dinitrobenzil, produced as described in Example 1, is treated at 50 to 60° in 1000 parts by volume of ethanol with the addition of 13 parts of a platinised charcoal catalyst, with hydrogen at low pressure; duration: 2 days; hydrogen taken up: 45,600 parts by volume. The reaction mass is filtered and the residue is extracted at 70° with 1 N-hydrochloric acid. The filtrate is then made weakly alkaline to litmus paper with sodium carbonate solution and the precipitated white base is isolated and dried. M. P. 231–236° (corr.); yield according to nitrite used: 95.7%.

Elementary analysis:

|   | found | calculated for 4.4'-dichloro-3.3'-diamino-hydrobenzoin $C_{14}H_{14}O_2N_2Cl_2$ |
|---|---|---|
|   | Percent | Percent |
| C | 53.49 | 53.68 |
| H | 4.51 | 4.51 |
| N | 9.10 | 8.95 |
| Cl | 22.40 | 22.62 |

A base with similar analysis values is obtained if 77.2 parts of 4.4'-dichloro-3.3'-diaminobenzil are hydrogenated in an analogous manner but with about a quarter of the amount of hydrogen mentioned above. In the infrared spectrum it was found that the O=O band at 5.98$\mu$ in 4.4'-dichloro-3.3'-diaminobenzil was missing in the hydrogenated product.

Example 4

A tetrazo solution from 4.4'-dichloro-3.3'-diaminobenzil is prepared according to Example 1. Also 18.0 parts of phenyl methyl pyrazolone are dissolved in 1500 parts of water and 60 parts by volume of 2 N-hydrochloric acid, the solution is cooled to 0 to 3°, and 360 parts by volume of 2 N-sodium acetate solution are added dropwise while stirring in half an hour and then the filtered tetrazo solution is added dropwise in another half hour. On completion of the coupling, the product is filtered off, washed and dried. The reddish yellow pigment has very good fastness to heat and light and fairly good fastness to migration. It corresponds to the formula

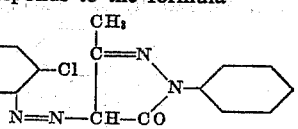

A strong reddish yellow pigment which has very good fastness to light and cross lacquering is obtained in an analogous manner from 4.4'-dichloro-3.3'-diamino-hydrobenzoin and phenyl methyl pyrazolone.

If in the above example, 1-(2'-chlorophenyl)-3-methyl-5-pyrazolone is used instead of 1-phenyl-3-methyl-5-pyrazolone, or if 1-(4'-methylphenyl)-3-methyl-5-pyrazolone is used, then similar pigments having similar properties are obtained.

Example 5

2.81 parts of 4.4'-dichloro-3.3'-diaminodibenzyl are dissolved in 25 parts by volume of 2 N-hydrochloric acid and 80 parts of water and the solution is tetrazotised at 0–3° with 20 parts by volume of 1 N-nitrite solution. Also 3.65 parts of acetoacetic anilide are dissolved in 300 parts by volume of water with the addition of 12 parts by volume of 2 N-hydrochloric acid. 32 parts by volume of 2 N-sodium acetate solution are added and the whole is cooled to 0–3°. The filtered tetrazo solution is then added dropwise while stirring to the above solution, the addition being performed within half an hour and, on completion of the coupling the whole is heated for one hour at 85°. The product is then filtered off, washed and dried. A very greenish, pure yellow is obtained which has good fastness to light and does not migrate in polyvinyl chloride. The pigment corresponds to the formula

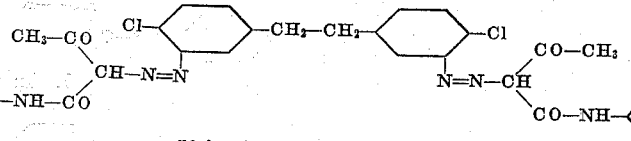

If in the above example the 3.65 parts of acetoacetic anilide are replaced by 3.95 parts of acetoacetic-o-anisidide, a pigment having similar properties is obtained.

The 4.4'-dichloro-3.3'-diaminodibenzyl used is produced as follows: A mixture of 9.3 parts of 4.4'-dichloro-3.3'-diaminobenzil, 110 parts of diethylene glycol, 6.2 parts of hydrazine hydrate and 8 parts of potassium hydroxide is slowly heated to 200° in a round flask fitted with an ascending tube and then the temperature is kept at 200° for 3 hours. After cooling, the solution is poured into 600 parts of water and the product which precipitates is isolated. It is purified by dissolving in diluted hydrochloric acid, precipitating with sodium carbonate solution and then recrystallising from hydrous pyridine and from alcohol with the addition of decolourising carbon. An almost white base is obtained which melts at 161–164° (corr.).

Elementary analysis:

|   | found | calculated for 4.4'-dichloro-3.3'-diaminodibenzyl $C_{14}H_{14}N_2Cl_2$ |
|---|---|---|
|   | Percent | Percent |
| C | 59.65 | 59.8 |
| H | 5.10 | 4.98 |
| N | 9.98 | 9.95 |
| Cl | 24.61 | 25.3 |

What we claim is:
1. An azo pigment having the general formula:

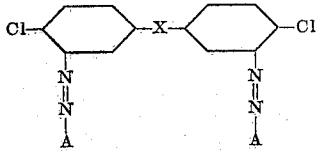

wherein X represents a bridge selected from the group consisting of $$-CH_2-CH_2-,\ -CH-CH-\ \text{and}\ -C-C-$$
$$\phantom{-CH_2-CH_2-,\ }\ \ \overset{|}{OH}\ \overset{|}{OH}\phantom{\text{and}\ }\ \overset{\|}{O}\ \overset{\|}{O}$$

A represents a member selected from the group consisting of 1-phenyl-3-methyl-5-pyrazolone-4-yl and α-acetoacetic acid phenylamide radicals.

2. An azo pigment having the general formula:

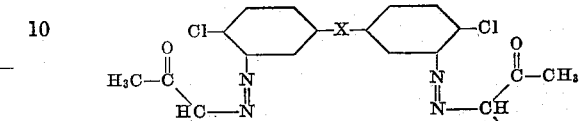

wherein X represents a bridge selected from the group consisting of $$-CH_2-CH_2-,\ -CH-CH-\ \text{and}\ -C-C-$$
$$\phantom{-CH_2-CH_2-,\ }\ \ \overset{|}{OH}\ \overset{|}{OH}\phantom{\text{and}\ }\ \overset{\|}{O}\ \overset{\|}{O}$$

B represents a mononuclear carbocyclic aryl radical.

3. An azo pigment having the formula:

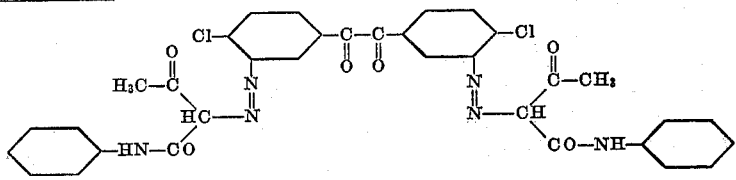

4. An azo pigment having the formula:

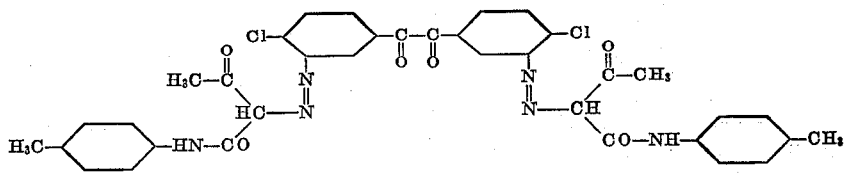

5. An azo pigment having the formula:

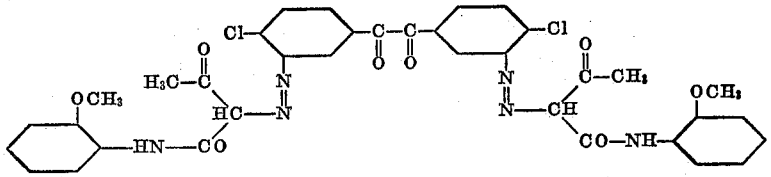

6. An azo pigment having the formula:

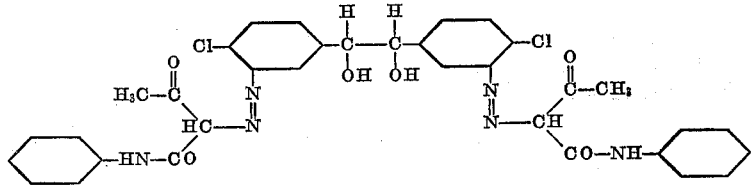

7. An azo pigment having the formula:

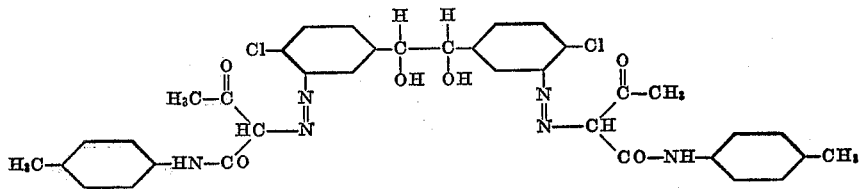

References Cited in the file of this patent

UNITED STATES PATENTS

| 619,518 | Ulrich | Feb. 14, 1899 |
| 2,191,800 | Murphy | Feb. 27, 1940 |

OTHER REFERENCES

D. W. Hein et al.: JACS, 1955, vol. 77, pp. 4107–4110, "New Pigments From 3,3'-Dichloro- and 33'-Dimethoxy-4,4'-Diaminostilbene."